Jan. 20, 1942.      C. J. KINZIE ET AL      2,270,527
PREPARATION OF ZIRCONIUM DIOXIDE
Filed Dec. 8, 1939

INVENTORS
Charles J. Kinzie,
Robert P. Easton &
Viatcheslav V. Efimoff,
BY Beau, Brooks, Buckley & Beau
ATTORNEYS Patented Jan. 20, 1942

2,270,527

UNITED STATES PATENT OFFICE 2,270,527

PREPARATION OF ZIRCONIUM DIOXIDE

Charles J. Kinzie, Robert P. Easton, and Viatcheslav V. Efimoff, Niagara Falls, N. Y., assignors to The Titanium Alloy Manufacturing Company, New York, N. Y., a corporation of Maine Application December 8, 1939, Serial No. 308,236

5 Claims. (Cl. 23—21)

This invention relates to the production of zirconium dioxide. More particularly, it relates to the production of zirconium dioxide of a high degree of purity from zircon and other ores of zirconium.

Zirconium oxide has in recent years found increasing uses in the arts, such as an opacifier for ceramics or as a refractory material. For many of these uses a product of a high degree of purity is desirable. The most abundant ore of zirconium is zircon, and several methods are known for producing zirconium oxide from this material. One of these methods involves the fusion of zircon with large quantities of alkali, such as seven parts of alkali to each part of zircon, and is described in Loveman Patent No. 1,261,948. Another method involves heating a zirconium ore, either zircon or other ore of zirconium, in an electric furnace, and then heating the resultant product with a material such as sodium sulfate. This is described in U. S. patent to Barton, No. 1,351,091, and to a lesser extent in Barton Patent No. 1,342,084. The method described in these last two patents, however, has several disadvantages. First, the intense heat of the arc, which is higher than necessary to conduct the reaction, causes the products formed to melt and form hard lumps which are difficult to act upon at later periods. Secondly, explosions have occasionally been observed to occur, which may in part be due to the first disadvantage. Thirdly, the product formed thereby is not a pure chemical compound, i. e., zirconium cyanonitride, but contains considerable quantities of zirconium carbide, which is more difficult to act upon than the cyanonitride. Finally, zirconium cyanonitride is not a material which is highly commercially useful as such, but only as an intermediate in the formation of other compounds. As by far the greater part of zirconium cyanonitride produced commercially is ultimately converted to zirconium dioxide, a more direct process of producing the latter material would be highly useful.

It is therefore an object of this invention to produce zirconium oxide by a new and improved method. It is another object to produce zirconium oxide of a high degree of purity. Another object is to produce zirconium oxide from zirconium ore through the medium of the electric furnace without treating with large quantities of chemicals. It is a further object to treat zirconium ores in an electric furnace without excessive danger of explosions and without forming unduly large quantities of zirconium carbide. Other objects will appear hereinafter.

These objects are accomplished by heating a mass of zirconium ore with carbon in the electric arc furnace while forcing air to the vicinity of the arc, removing the mass from the furnace and exposing to the atmosphere while still hot, and continuing to expose the hot mass to the atmosphere until substantially all of it has reacted to zirconium dioxide.

Figure 1:
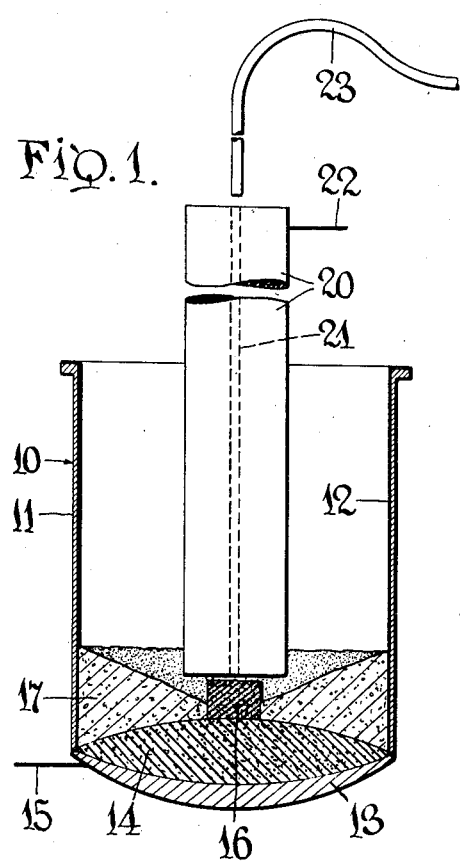
Fig. 1 is a cross-sectional elevation of an electric furnace suitable for the practice of this invention, shown at the start of the furnacing operation.

Referring now to the drawing, an electric furnace, indicated generally at 10, consists of a cylindrical shell 11 of sheet iron provided with a lining 12 of thick asbestos paper. This shell is set upon a bottom wall 13 which is preferably a cast iron piece of dished shape. On this bottom wall there is rammed a mass 14 of electrically conductive material, such as a mixture of carbon and tar, which constitutes the hearth of the furnace and which, through the bottom wall 13, forms one electrode of the arc. The other electrode 20 is movable vertically, and is provided with a hollow central passage 21. These two electrodes are connected to a suitable source of electricity (not shown), through the leads 22 and 15. The central passage 21 in the upper electrode 20 is for the forcing of a current of air to the vicinity of the arc. A controlled quantity of air is forced from a source (not shown) through a hose 23 and the passage 21 throughout the operation.

When the furnace is ready to be operated, a block of hard carbon 16 is placed in the center of the hearth 14, and in good electrical contact therewith. This block avoids excessive heating of the hearth 14 and bottom piece 13, and aids in the creation of the arc at the start of the operation, since a mixture of zircon and coke is not sufficiently electrically conductive. In place of the carbon block, zirconium cyanonitride or zirconium carbide or mixtures thereof may be placed between the hearth 14 and the electrode 20, or the arc may be directly between the electrode 20 and the hearth 14. The upper electrode 20 is then placed in its lowermost position, an arcing distance above the block 16. The electric current and the flow of air through the passage 21 is then started, either before or after the first batch of zirconium ore and carbon is shoveled in. It is preferred to subject the furnace to a preliminary heating operation before placing any zirconium ore and carbon therein, principally in order to drive off any volatile matter from the hearth 14.

A mixture of zirconium ore and carbon 17 is then shoveled into the furnace. Care should be taken that this mixture does not fill the space between the block 16 and the electrode 20. This can conveniently be done by having the mixture slope downwards towards the center, as shown in Fig. 1. As the action proceeds, the mixture of zirconium ore and carbon (preferably in the form of coke, as hereinafter pointed out) reacts with the nitrogen of the atmosphere to form a compound of zirconium, carbon and nitrogen, and most of the impurities, including silica formed from this reaction, are driven off. The mixture of zirconium ore and coke at the sides of the mass acts as a heat insulator. In the course of the process this insulating layer becomes thinner, due to the reaction of the underlying material. At the same time, the reacted material acts as a conductor of electricity. To counteract both these effects, additional ore and coke is piled into the furnace at periodic intervals and the electrode simultaneously raised, so that the arc is then between the top surface of the reacted mass 18 (see Fig. 2) and the electrode 20.

The zirconium ore employed as a raw material for this process is preferably zircon, since this material is relatively abundant. However, other ores of zirconium, such as baddeleyite, zirkelite and others, may be used. In addition, impure or unreacted material, called "refuse" and described hereinafter, from previous runs of the furnace may be included. The carbon mixed therewith is preferably coke of a high degree of purity. For this purpose calcined petroleum coke has been found satisfactory. Any coke containing a high percentage of carbon, low percentage of volatile matter, and minimum quantities of discoloring impurities is preferable. The presence of volatile matter cuts down the efficiency of the reaction and increases losses. The presence of discoloring impurities (e. g. iron, vanadium, etc.) is in many cases undesirable because such impurities may be carried over into the final product. For some purposes, of course, particularly where a colored final product is not undesirable, less pure forms of coke may be used. Instead of coke, other forms of carbon, such as graphite, may be used.

The relative quantities of carbon and zirconium ore may be varied within wide limits. Obviously, the smallest quantity of carbon that will produce the desired result without wastage is preferred, since the carbon does not appear in the final product. As a practical matter, about 1 part of coke to 5 parts of zircon has been found most suitable.

Figure 2:
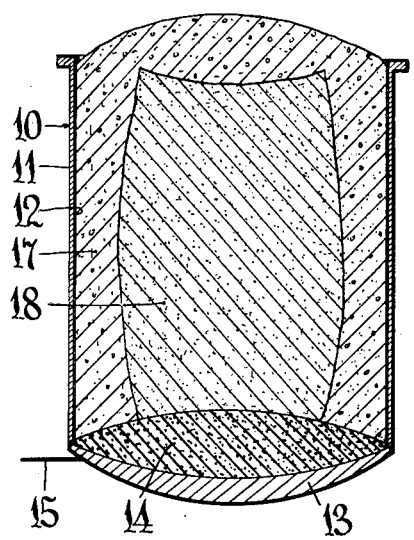
Fig. 2 is a view similar to Fig. 1 showing the furnace at the conclusion of the furnacing operation.
Figure 4:
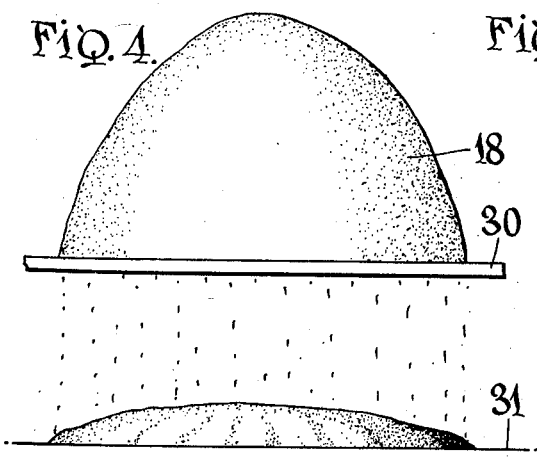
Fig. 4 is an elevational view of an apparatus in which the hot mass of material from the electric furnace may be placed for conversion to zirconium dioxide.

After the completion of the furnacing operation, the time of which varies with the size of the furnace, the electric current and the air are shut off, the electrode 20 raised and swung to one side, and a quantity of insulating material immediately thrown on the top of the mass, as shown in Fig. 2. This insulating material is conveniently the same mixture of zirconium ore and carbon that is employed as raw material in the furnacing operation. The mass is then allowed to cool sufficiently long to permit easy removal of adhering impurities but not so long that the mass will disintegrate upon exposure to the atmosphere. This period likewise varies with the size of the furnace. When it has cooled sufficiently, the shell 11 is raised vertically off the hearth 14 by means of a crane or other suitable device (not shown), exposing the hot reacted mass 18 to the atmosphere. Adherent particles of unreacted material are immediately removed (i. e. the mass is "cleaned"), and this is conveniently done by means of a blast of compressed air, which is played over the entire exposed surface of the mass. As the mass begins to oxidize immediately, this should be done as quickly as possible. The removed material is known as "refuse," and consists of a mixture of zirconia, zircon, zirconium carbide, zirconium cyanonitride, and carbon.

Figure 3:
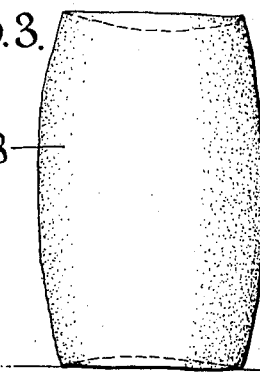
Fig. 3 is an elevation of a cleaned reacted mass ready for conversion to the oxide.

When the refuse has been removed as thoroughly as possible, the mass 18 is transferred to an oxidizing grate, shown at 30 in Fig. 3, or other suitable apparatus to accomplish oxidation. The oxidation may be facilitated by agitating the mass from time to time, or by furnishing excess air such as by means of a blower, or both. The air blower may also aid in the removal of dust. As the oxidation proceeds, the mass begins to crumble, and the material falls through the grate 30 to the floor 31, where the reaction may continue. Oxidation of the hot material on the floor 31 may be aided by spreading in thin layers, e. g. 3 inches thick, on a clean brick floor. When it has cooled sufficiently, it is then ready for further purification.

The material at this point is for the most part in a fine state of subdivision. The impurities that are present are mostly aggregated into larger lumps. These lumps may be removed and the material graded as to size by sifting through a sieve, such as first through a ½ inch screen and then through a 35 mesh screen. The material which does not pass through these screens is "refuse" and is used again. The material which passes the screens shows a very high percentage of $ZrO_2$. A typical analysis is as follows:

| | |
|---|---:|
| $ZrO_2$ | 95.38 |
| $SiO_2$ | 2.75 |
| SiC (silicon carbide) | 1.00 |
| $TiO_2$ | 0.30 |
| $Fe_2O_3$ | 0.06 |
| $Al_2O_3$ | 0.10 |
| $HfO_2$ | 0.07 |
| CaO | 0.10 |
| MgO | 0.05 |
| $P_2O_5$ | 0.03 |
| $CeO_2$ | 0.05 |
| Others | 0.11 |
| | 100.00 |

After screening, the material may be further purified by well known methods, such as milling to a size of 325 mesh, calcining, etc.

Having described the invention, the following example of a specific procedure is now given.

*Example*

A furnace described as above, approximately 5 feet high and 4 feet in diameter, is first heated for a preliminary period of 20 minutes without any zirconium ore and carbon therein. The current input is adjusted at 15,000 amperes at 50 volts. At the same time the air input through the passage in the upper electrode is adjusted to 6 cubic feet per minute. After the preliminary heating period, 75 pounds of a mixture of 62.5 parts of zircon sand, 13.3 parts of high carbon coke and 24.2 parts of refuse is shoveled in the furnace as described above. Every 10 minutes thereafter 75 pounds of mixture is shoveled in until the furnace is full, and the upper electrode raised to secure a suitable arc each time material is shoveled in. At the conclusion of the furnacing operation, which takes from 32 to 36 hours, the current and air are shut off, the electrode swung to one side and additional mixture piled on the top. The mass is then allowed to cool for 12 to 24 hours. At the end of this period, the shell is removed and the mass cleaned as described above. It is then oxidized on a grate as described above. After screening successively on a ½ inch and a 35 mesh screen, it is ready for further purification.

The present method has been found to secure a pure grade of zirconium dioxide much more easily, quickly and cheaply than hitherto obtainable. Whereas the method of Barton Patent No. 1,351,091 required a period of three weeks or more to completely cool the mass of zirconium cyanonitride, the present method allows the mass to cool for less than a day before oxidation begins. Furthermore, the Barton method resulted in much greater quantities of impurities and resultant waste. Finally, large quantities of additional materials are not necessary as in the process described in the Loveman Patent No. 1,261,948.

As many variations are possible within the scope of this invention, it is not intended to be limited except as defined by the appended claims.

We claim:

1. A method of preparing zirconium dioxide comprising heating in an electric arc furnace a mixture of zirconium ore and carbon, forcing air directly into the arc during said heating step, forming a reaction mass of zirconium, carbon and nitrogen, exposing to the atmosphere said mass prior to cooling to atmospheric temperature, and continuing to expose said mass to the atmosphere until substantially all the material is reacted to zirconium dioxide.

2. A method of preparing zirconium dioxide comprising heating in an electric arc furnace a mixture of zirconium ore and carbon, forcing air directly into the arc during said heating step, forming a reaction mass of zirconium, carbon and nitrogen, partially cooling said mass prior to exposure to the atmosphere, exposing said mass to the atmosphere while still hot, and continuing to expose said mass to the atmosphere until substantially all the material is reacted to zirconium dioxide.

3. A method of preparing zirconium dioxide comprising heating in an electric arc furnace a mixture of zircon and coke, forcing air directly into the arc during said heating step, forming a reaction mass of zirconium, carbon and nitrogen, exposing to the atmosphere said mass prior to cooling to atmospheric temperature, removing adherent particles of unreacted material from the exterior of said mass, and continuing to expose said mass to the atmosphere until substantially all the material is reacted to zirconium dioxide.

4. A method of preparing zirconium dioxide comprising heating in an electric arc furnace a mixture of zircon and coke, forcing air directly into the arc during said heating step, forming a reaction mass of zirconium, carbon and nitrogen, partially cooling said mass prior to exposure to the atmosphere, exposing said mass to the atmosphere while still hot, removing adherent particles of unreacted material from the exterior of said mass, and continuing to expose said mass to the atmosphere until substantially all the material is reacted to zirconium dioxide.

5. A method of preparing zirconium dioxide comprising heating in an electric furnace a mixture of zircon and coke, forcing air directly into the arc during said heating step by means of a passageway extending through one of the electrodes of the furnace, forming a reaction mass of zirconium, carbon and nitrogen, partially cooling said mass prior to exposure to the atmosphere, exposing said mass to the atmosphere while still hot, removing adherent particles of unreacted material from the exterior of said mass, and continuing to expose said mass to the atmosphere until substantially all the material is reacted to zirconium dioxide.

CHARLES J. KINZIE.
ROBERT P. EASTON.
VIATCHESLAV V. EFIMOFF.